Oct. 21, 1952 R. C. HALL ET AL 2,614,598
PROTECTIVE COVER FOR AUTOMOBILE STORAGE BATTERIES
Filed May 5, 1951

INVENTOR.
RAY E. MOCK and
BY ROBERT C. HALL
Anderson & Muller
ATTORNEYS

Patented Oct. 21, 1952

2,614,598

UNITED STATES PATENT OFFICE 2,614,598

PROTECTIVE COVER FOR AUTOMOBILE STORAGE BATTERIES

Robert C. Hall, Evergreen, and Ray E. Mock, Denver, Colo.

Application May 5, 1951, Serial No. 224,815

3 Claims. (Cl. 150—52)

This invention relates to improvements in protective covers for automobile storage batteries.

At present it is customary to position the storage batteries for the ignition and lighting systems of automobiles in the engine compartment, adjacent to the engine and under the engine hood. Storage batteries so positioned are readily accessible for servicing and testing and to this extent the present practice is desirable.

Automobile mechanics find that when they are engaged in the inspection, testing or repair of the engine and attached parts they invariably bring the sleeves of their upper garments into contact with the battery. Since storage batteries of the automobile type, in practically every case have their upper surfaces covered more or less with electrolyte, which is a strong solution of sulphuric acid, those parts of the workmen's clothes that came into contact therewith have openings eaten therein by the said electrolyte. Since the workmen's clothes that are damaged are expensive it is evident that the exposed position of the batteries is objectionable for the reason pointed out. If the workman has his sleeves rolled up then the acid coming into contact with the bare skin causes severe acid burns. The position of the batteries makes it difficult to cover them with an ordinary rubber or other acid resistant material and as a result the workman or mechanic takes a chance of injuring himself or damaging his clothes. It is the object of the invention to produce a blanket or cover of rubber or other acid resistant material such as plastic, which is so cut or shaped that it can easily be applied to an automobile battery and folded about it in such a manner that it will effectively shield it from contact with the mechanic's clothes or body.

In order to explain the invention and the manner in which it is used, reference will now be had to the accompanying drawing in which the invention has been illustrated and its manner of use shown by appropriate figures, which will now be briefly described.

Figure 1:
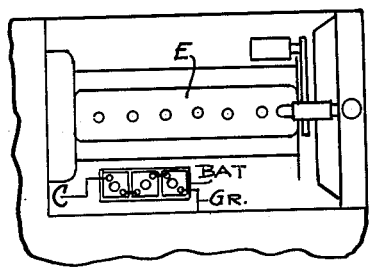
Figure 1 is a diagrammatic view looking down onto the engine and battery, showing one of the several relative positions of the engine and battery.

In the drawing the engine has been designated by letter E and the battery by Bat. The battery ground connection has been designated by Gr and the battery cable by C.

Figure 7:
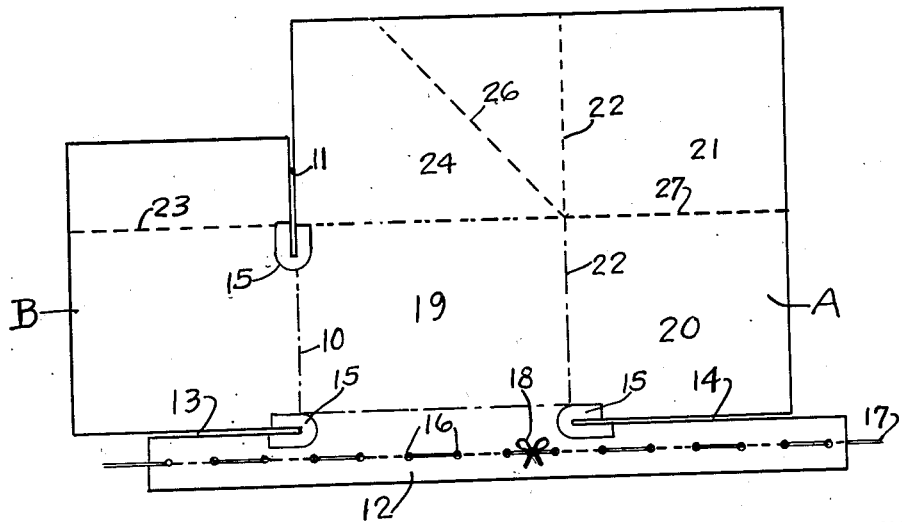
Figure 7 shows a development of the blanket.

Referring now more particularly to Fig. 7, it will be seen that the acid resistant blanket which is preferably made from natural or synthetic rubber or some suitable plastic having similar properties, comprises two rectangular sections A and B that are integrally connected along dot and dash line 10 and separated by a slit 11. The rectangle outlined by dot and dash lines represents the outline of the top of the battery to be covered and the lines designated by dashes represent fold lines. Part A has integrally connected with it along the lower dash and dot line a band 12 that has its ends separated from the remaining parts of the blanket by slits 13 and 14. Reinforcing members 15 of U-shape are vulcanized to the material at the ends of the slits to preclude tearing at these points.

Band 12 is provided with a number of equally spaced holes 16 through which an acid resistant cord 17 is threaded. The cord is knotted at 18 or otherwise attached to the blanket to prevent it from being accidentally pulled out. If the material is thin, holes 16 may be suitably reinforced.

Figure 2:
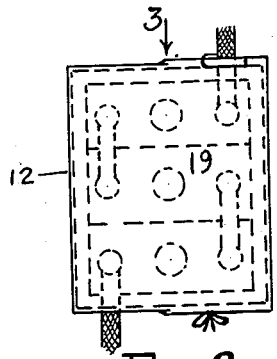
Figure 2 is a top plan view of the battery showing the same with the protective blanket in place thereon.
Figure 3:
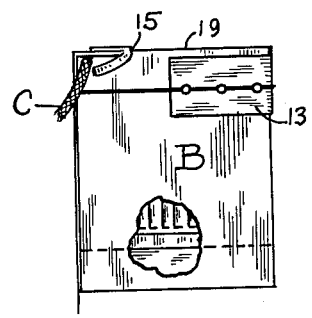
Figure 3 is an end elevation looking in the direction of arrow 3 in Fig. 2.
Figure 4:
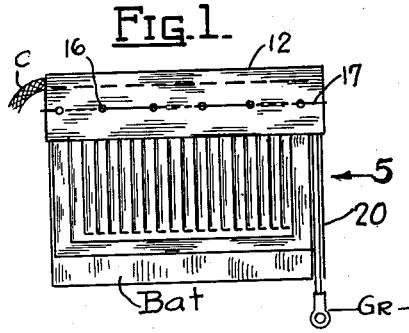
Figure 4 is an elevational view of the side of the battery farthest from the engine.
Figure 5:
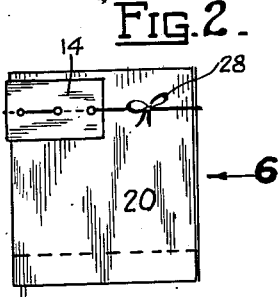
Figure 5 is an end elevation looking in the direction of arrow 5 in Fig. 4.
Figure 6:
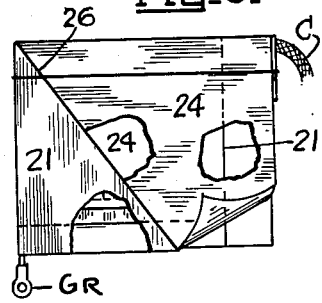
Figure 6 is an elevational view of the side facing the engine and looking in the direction of arrow 6 Fig. 5.

Let us now assume that a battery having an outline like that indicated by the dash and dot rectangle in Fig. 7, is to be covered. That part of the blanket bounded by the dash and dot rectangle which has been designated by reference number 19, is positioned over the top of the battery after which the rectangular portion B is folded down along the left hand end of the battery when viewed as in Fig. 1. The battery cable C is positioned in slit 11 near the reinforcing member 15. The band 12 is folded downward along the outward facing wall of the battery as shown in Figs. 2 and 4. That part of the blanket comprising the rectangular portions numbered 20 and 21 are then bent downward along the broken line 22. That part of rectangle B beyond line 23 is then folded against the inner wall of the battery and held there temporarily while the two rectangular portions 21 and 24 are folded along lines 22 and 26 and the fold represented by line 22 pushed upward between the battery wall and the blanket until it is parallel with the top of the battery. The cord 17 is now wrapped about the blanket and tied at 28. The cord 17 holds the ends 13 and 14 against ends of the battery and the blanket is thereby held in the positions illustrated in Figs. 2 to 6 inclusive; parts 21 and 24 can, of course, be folded so that fold 22 is on the outside, but this is hardly desirable.

The blanket that has been illustrated has been designed and proportioned to fit the battery shown. It is, of course, evident that blankets can be designed for any size of battery and that any one size will usually serve for several sizes.

What we claim as new is:

1. An acid-resistant protective blanket for use in covering an automobile storage battery or the like, to prevent a workman's clothes from coming into contact with the electrolyte while effecting repairs, said blanket comprising a single sheet of material formed from two rectangular portions of different sizes, one edge of the two portions being in alignment, the larger rectangular portion having a width from the common aligned edges, slightly greater than the width of the battery to be covered plus the height of the battery, and a length slightly greater than the length of the battery plus the height thereof, the smaller rectangular portion having a width greater than the width of the battery and foldable about one end and a portion of one side thereof, the larger rectangular portion covering the top of the battery, one end and said side thereof, there being a band along the aligned edges integral with the blanket for a distance at least as great as the length of the battery, and a cord of acid-resistant material attached to the band, the cord having a length sufficient to surround the battery to hold the folded blanket in place thereon.

2. A flexible blanket of acid-resistant material for use in covering an automobile storage battery and the like, to protect a workman's clothes from coming into contact with acid on the outer surface of the battery, said blanket having two rectangular portions of unequal sizes arranged with one edge of each in alignment, the larger portion being of sufficient size to cover the top, one end and one side of the battery, the smaller portion being of a size to cover the other end and a portion of the side covered by the larger portion, the blanket having a narrow band-like portion along the common edges, the band being integral with the larger rectangular portion only for a distance at least as long as the length of the battery to be covered, the band being arranged to be turned down along the other side of the battery, and an acid-resistant cord attached to the band of a length to surround the battery and to hold the cover in place thereon.

3. A blanket of acid-resisting material for use in covering an automobile storage battery to protect a workman's clothes from contact with the surface of the battery casing, the blanket consisting of a sheet having two integral rectangular portions of different sizes and having one edge of each in alignment, the larger portion having a width slightly larger than the width of the battery plus the height of the battery and a length slightly greater than the length of the battery plus the height thereof, the smaller rectangular portion having a width slightly greater than the width of the battery, the common edge having a band integral with the larger rectangular portion for a distance at least as great as the length of the battery, the larger rectangular portion being of sufficient size to cover the top, one end and one side of the battery, the blanket being foldable to cover the upper portion of the other side, the smaller rectangular portion being of a size to cover the other end of the battery and lap a portion of the side covered by the larger portion, and an acid-resistant cord carried by the band, of sufficient length to surround the battery to hold the blanket in folded position thereon.

ROBERT C. HALL.
RAY E. MOCK.

REFERENCES CITED

The following references are of record in the file of this patent:

UNITED STATES PATENTS

| Number | Name | Date |
|---|---|---|
| Re. 10,450 | Kraemer | Feb. 26, 1884 |
| 1,648,612 | Evans | Nov. 8, 1927 |
| 1,669,616 | Johnson | May 15, 1928 |
| 1,787,184 | Altheimer | Dec. 30, 1930 |
| 1,985,008 | Altheimer | Dec. 18, 1934 |
| 2,488,360 | Williams | Nov. 15, 1949 |